United States Patent [19]

Anderson

[11] Patent Number: 4,845,872
[45] Date of Patent: Jul. 11, 1989

[54] WATERFOWL DECOY

[76] Inventor: Scott E. Anderson, 14113 Holly Rd., Eden Prarie, Minn. 55346

[21] Appl. No.: 226,781

[22] Filed: Aug. 1, 1988

[51] Int. Cl.$^4$ .............................................. A01M 31/06
[52] U.S. Cl. ............................................................. 43/3
[58] Field of Search ........................................... 43/2, 3

[56] References Cited

U.S. PATENT DOCUMENTS

| | | | |
|---|---|---|---|
| 1,062,713 | 5/1913 | Johnson | 43/3 |
| 3,707,798 | 1/1973 | Tryon | 43/3 |
| 4,251,937 | 2/1981 | Curley | 43/3 |
| 4,651,457 | 3/1987 | Nelson et al. | 43/3 |

Primary Examiner—M. Jordan

[57] ABSTRACT

The silhouette goose decoy is designed for effective hunting and for convenient storage and transportation. The decoy has a flat silhouette plate with the perimeter of the plate defining the outline of a lateral view of the body, neck and head portions of a goose. The silhouette plate has non-glare opposing parallel surfaces with macroscopic depressions and elevations capable of preventing mirror-like glare of reflected sunlight. A black sunlight absorbing coating covers the neck portion of the front, top and rear of the head portion and the top and front bottom of the body portion of the opposing surfaces. A white coating covers the middle bottom of the head portion and the rear bottom of the body portion of the opposing surfaces. A stake supports the plate and is attached to the body portion of the silhouette plate with a pivotable and lockable connection. The silhouette plate is rotatable in a plane perpendicular to the ground in a clockwise or counterclockwise direction about the connection. The silhouette plate is then locked in any of a multitude of positions for decoy use in hunting and is locked with the stake adjacent the head portion for convenient storage and transportation.

12 Claims, 2 Drawing Sheets

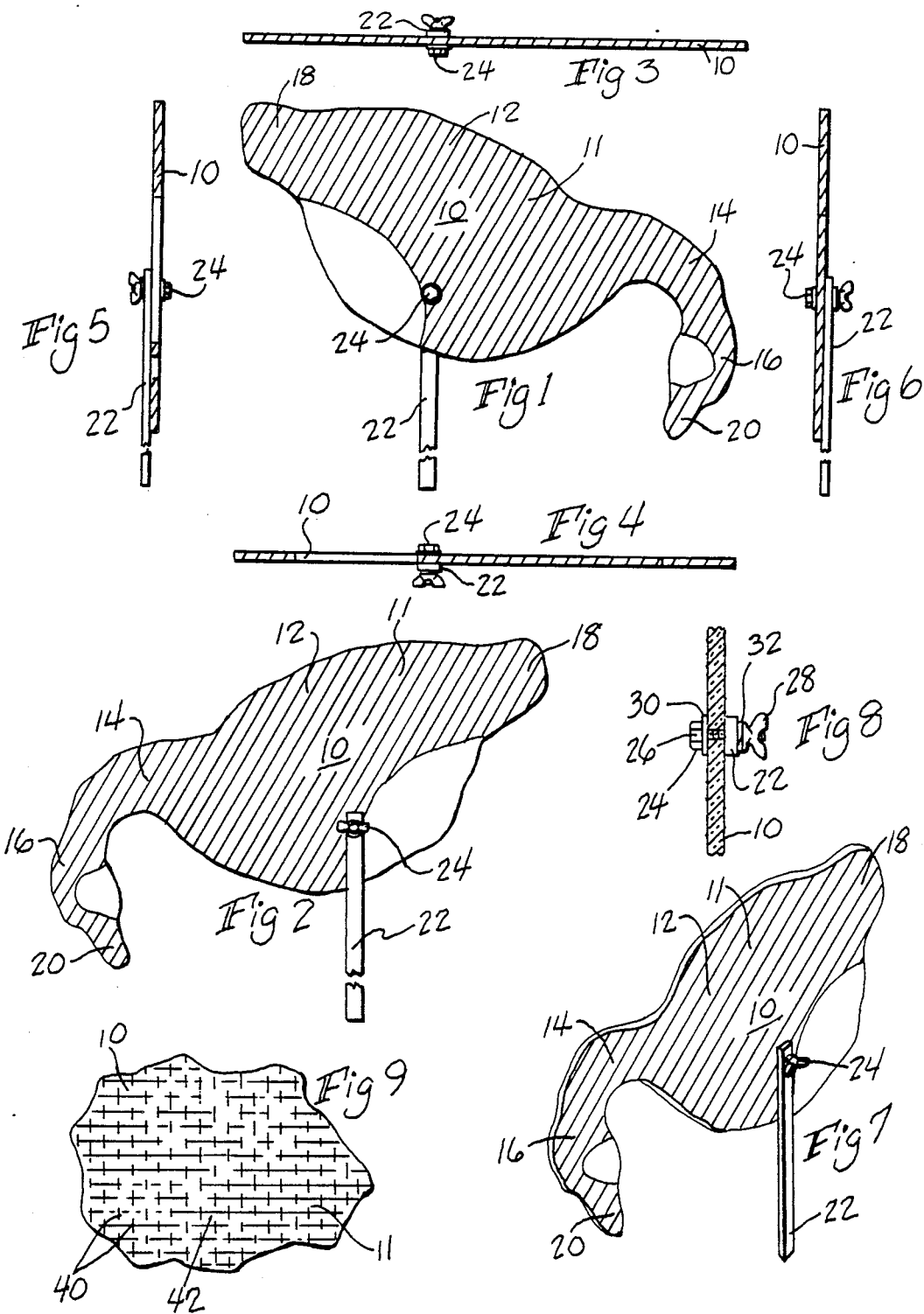

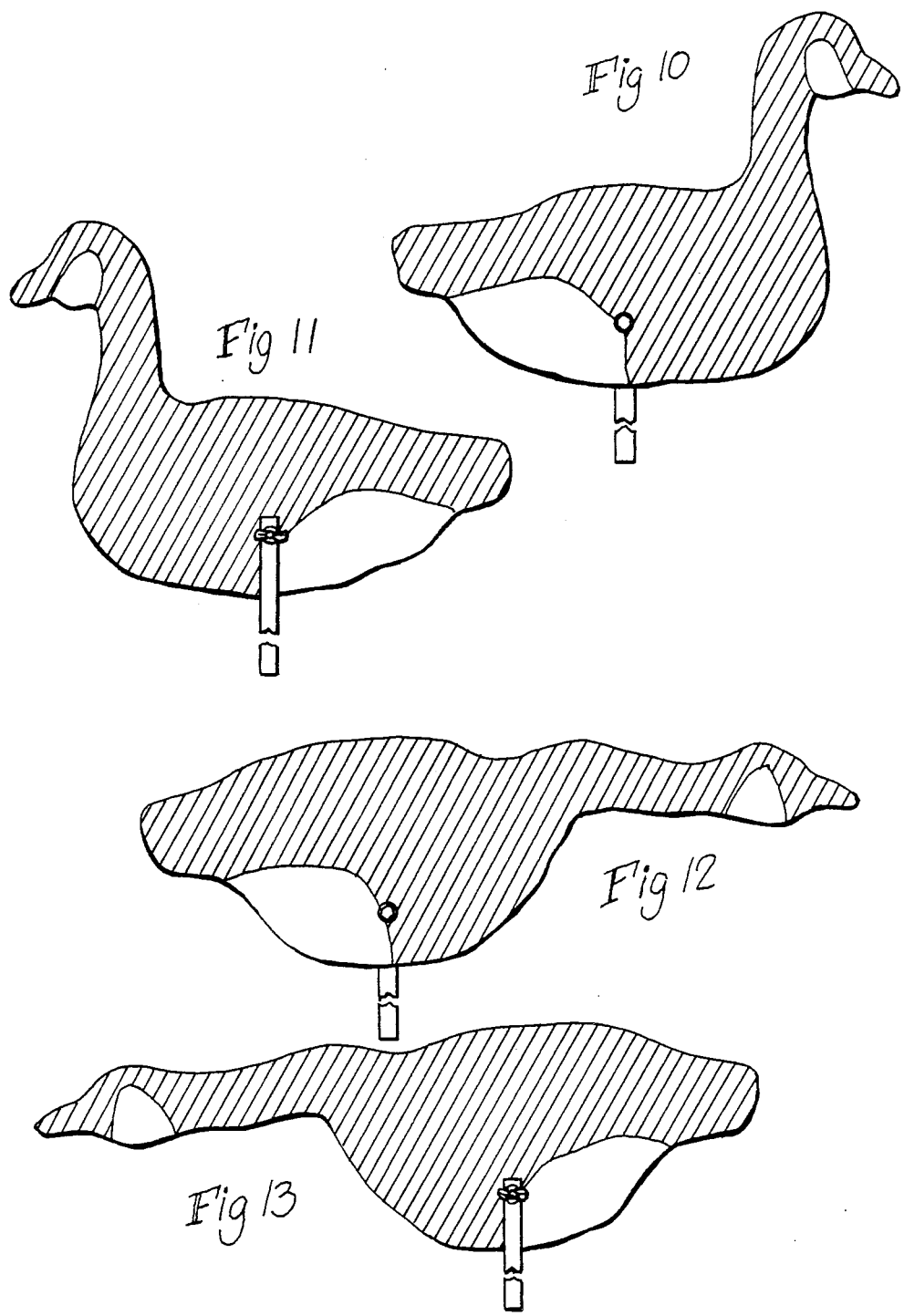

WATERFOWL DECOY

BACKGROUND OF THE INVENTION

This invention relates to an effective silhouette decoy for goose hunting. This invention also relates to a decoy that is compact for convenient storage and transportation.

Others have heretofore proposed silhouette decoys. For example, decoys constructed of plastic bags, sacks, sheets, floating decoys, taxidermied decoys and several other types of decoys in a multitude of designs have been used by hunters. Hunters have been attempting for years to find an effective and economical goose decoy.

Others have also proposed several devices for transporting goose decoys such as a goose decoy backpack and even a specialized trailer designed to haul and store taxidermied geese decoys. The transportation and storage of hundreds of goose decoys which can be used by a single hunter has long been recognized as a problem.

Insofar as known, however, no one has heretofore figured out a way to provide a silhouette decoy that is effective, economical, positionable in a multitude of different settings and is compactable for simplified storage and transportation.

SUMMARY OF THE INVENTION

This invention provides an effective and economical silhouette goose decoy. The goose decoy is formed of a silhouette plate having flat opposing parallel surfaces. The silhouette plate defines the perimeter of the outline of the goose body, neck and head portions from a lateral view. The opposing surfaces of the silhouette platehave macroscopic depressions and elevations capable of preventing mirror-like glare of reflected sunlight.

A black sunlight absorbing coating covers the neck portion, the front, top and rear of the head portion and the top and front bottom of the body portion of the opposing surfaces of the silhouette plate. The black coating follows the contour of the depressions and elevations of the non-glare surface. A white coating covers the middle bottom of the head portion, and the rear bottom of the body portion of the opposing surfaces. The white coating also follows the contour of the depressions and elevations of the non-glare surfaces. The black and white coatings exaggerate the goose's natural appearance to make the decoys highly visible to geese. The non-glare coating helps prevent the geese from distinguishing the decoys from living geese.

A stake is attached to the body portion of the silhouette plate by a pivotable and lockable connection. The stake is inserted into the ground to support the silhouette plate. The silhouette plate is rotatable in a plane perpendicular to the ground in a clockwise or counterclockwise direction about the connection of the stake. The connection is then locked in any of a multitude of positions for decoy use in hunting. The multiple positions of the decoy add to the lifelike appearance of the decoys. The stake is also lockable adjacent the head portion for simplified and compact storage and transportation of the goose decoys. Preferably the stake is black and attached at a black sunlight absorbing region of the body portion of the goose to camouflage the stake from the geese. The stake is ideally metal for piercing through frozen ground. Preferably the stake is attached with a threaded bolt and wing nut of non-glare material.

The non-glare silhouette plate surface is preferably formed of a screen pattern of depressions and elevations. The depressions and elevations prevent the mirror-like glare of reflected sunlight. Optionally a textured paint or roughened surface may be used to form the non-glare surface, but not as effectively as use of the screen pattern. Preferably, the hunter uses a combination of lateral views of goose decoys in three different positions to simulate a flock of geese. The positions which are used are the sentry position, feeding position and reaching position.

A multitude of additional features and benefits and advantages of the invention will become evident as this description further proceeds.

BRIEF DESCRIPTION OF DRAWINGS

FIG. 1 is a schematic right side plan view of a silhouette goose decoy in the feeding position with the stake partially broken away;

FIG. 2 is a schematic left side plan view of the silhouette goose decoy of FIG. 1 with the stake partially broken away;

FIG. 3 is a schematic top plan view of the decoy of FIG. 1;

FIG. 4 is a schematic bottom plan view of the decoy of FIG. 1;

FIG. 5 is a schematic rear plan view of the decoy of FIG. 1;

FIG. 6 is a schematic front plan view of the decoy of FIG. 1;

FIG. 7 is a schematic perspective view of the goose decoy of FIG. 1;

FIG. 8 is a schematic cross section of the silhouette plate of the goose decoy of FIG. 1 with parts broken away and illustrates the pivot connection of the stake to the plate;

FIG. 9 is a schematic surface view of the non-glare silhouette plate of the goose decoy of FIG. 1, with parts broken away;

FIG. 10 is a schematic right side view of a silhouette goose decoy in the sentry position with the stake partially broken away;

FIG. 11 is a schematic left side view of the goose decoy of FIG. 10 with the stake partially broken away;

FIG. 12 is a schematic right side view of a silhouette goose decoy in the reaching position with the stake partially broken away; and FIG. 13 is a schematic left side view of the goose decoy of FIG. 12 with the stake partially broken away.

DESCRIPTION OF PREFERRED EMBODIMENTS

Referring to FIGS. 1 and 2, the goose decoy is constructed of a silhouette plate 10 having flat opposing (left and right sides) parallel non-glare surfaces 11. The silhouette plate defines the perimeter of the outline of the goose body portion 12, neck portion 14 and head portion 16 from a lateral view. The silhouette plate preferably also defines the tail feathers 18 of the body portion 12 and the beak 20 of the head portion 16. The opposing surfaces 11 of the silhouette plate have macroscopic depressions and elevations capable of preventing mirror-like glare of reflected sunlight, which would alert the geese to the hunter's presence.

A black sunlight absorbing coating (shown in the Figures as cross hatching) covers the neck portion 14, the front, top and rear of the head portion 16 and the top and front bottom of the body portion 12 of the opposing surfaces 11. The black coating is thin enough to follow the contour of the depressions and elevations of the non-glare surface 11. A white coating covers the middle bottom of the head portion, and the rear bottom of the body portion of the opposing surfaces. The white coating also follows the contour of the depressions and elevations of the non-glare surfaces. The black and white coatings do not fill in the depressions because this would negate the non-glare surface of the silhouette plate. The black and white markings simulate the markings of the Canada goose. The boarder between the white and black portions of the non-glare surfaces is ideally sharp. This creates a clear black and white contrast that is highly visible. The decoys can easily be seen with the naked eye at a distance of 0.8 kilometers or about one half mile away. The decoys are even visible with the naked eye at distances of 1.6 kilometers or about 1 mile. The non-glare coatings have a matte finish to prevent the geese from distinguishing the decoys from live geese. The black and white coatings exaggerate the Canadian goose's natural appearance, making the decoys highly visible to geese.

The stake 22 is attached to the body portion of the silhouette plate by a pivotable and lockable connection 24. The stake 22 is inserted into the ground to support the silhouette plate 10. The silhouette plate 10 is rotatable in a plane perpendicular to the ground in a clockwise or counterclockwise direction about the connection 24 of the stake 22. The connection 24 is then locked in any of a multitude of positions for decoy use in hunting. The multiple positions of the decoy contribute to the lifelike appearance of the decoys to a flying flock of geese.

Referring to FIG. 8, a threaded bolt 26 and a wing nut 28 form the pivotabl and lockable connection 24. The washer 30 protects the silhouette plate 10 from the threaded bolt 26 and the lock washer 32 adjacent the stake 22 prevents the wing nut 28 from twisting off of the threaded bolt 26. The connection 24 preferably does not reflect sunlight in a manner which creates a shiny metallic appearance to the geese. Ideally, the threaded bolt 26, wing nut 28, washer 30 and lock washer 32 are constructed of or coated with non-glare material.

The stake 22, (referring back to FIG. 1) is also lockable adjacent the head portion 16 for storage and transportation of the goose decoys. Several decoys may be stacked for compact and simplified transportation and storage. Preferably the stake 22 is black and attached at a black sunlight absorbing region of the body portion 12 of the goose to camouflage the stake 22 from the geese. The stake is also constructed of a strong metal, such as a plain carbon steel, for piercing through frozen ground. The stake is of a suitable length to firmly support the goose decoy. Preferably, the stake has a flat end which is inserted into the ground. The flat end helps prevent injury from the stake. Optionally, the stake may be sharpened for simplified insertion of the stake into the ground.

The silhouette plate 10, as illustrated in FIG. 9, is preferably constructed of a unique fiber board and resin combination. The board preferably is not greater than 5 millimeters thick. The non-glare surface 11 is rough and wood fibers project irregularly from the surface 11. The irregular wood fibers help to prevent mirror-like glare of sunlight. The unique non-glare surfaces 11 of the silhouette plate 10 are preferably formed of a screen pattern of macroscopic depressions 40 and elevations 42 on both sides of the silhouette plate 10. The depressions and elevations are formed by pressing a wire screen into the silhouette plate. The wire deforms the wood fibers to form a screen pattern in the wood fibers. The depressions surround and define generally square shaped elevations 42. The depressions 40, elevations 42 and wood fibers combine to prevent the mirror-like glare of reflected sunlight which would warn oncoming geese of the hunters presence.

Optionally, a textured paint or roughened irregular surface is used to form the non-glare surface. The textured paint has a matte finish and is applied onto the non-glare surface. Alternatively, a flat surface may be sanded to coarsen the surface to form irregular depressions and elevations. However, the irregular macroscopic depressions and elevations of the textured or sanded surface are more difficult to manufacture and do not prevent the mirror-like glare of sunlight as effectively as the screen pattern.

The decoys are used in the practice of hunting to simulate a flock of geese. The decoys are manufactured to resemble lateral views of geese in three different positions. The geese are manufactured in the feeding position, sentry position and reaching position. The feeding position (see FIGS. 1–7) has the head down as if the goose were feeding. In the sentry position (see FIGS. 10 and 11) the goose's head is up as if it were watching out for danger. The neck and head portions are stretched forwardly and outwardly from the body portion in the reaching position (see FIGS. 12 and 13). The decoys of FIGS. 10–13 have all of the features of the decoy in FIGS. 1 through 9, but have a differently shaped neck and head portions of the silhouette plate.

Several decoys of geese in equal proportion of these three positions effectively simulate life-like positions of a flock of feeding geese. Also, the geese are rotated about the connection to vary the positions of the geese from goose to goose, so that no two goose decoys have to appear exactly alike. The sentry, feeding and reaching positions combined with the pivoting silhouette plate allow the hunter to creatively set up a realistic appearing flock of geese that is highly visible to geese from a great distance.

The silhouette decoys may also be alternatively coated to be used for effective hunting of snow geese. The non-glare surfaces are white coated with a black sunlight absorbing coating partially covering the tail and head portions.

Those skilled in the art will appreciate that the invention may be embodied in other specific forms then illustrated without departing from the spirit or essential characteristics thereof. The present embodiments are therefore are to be considered in all respects illustrative and not restrictive, the scope of the invention being indicated by the appended claims rather than by the foregoing description; and all changes which come within the meaning and a range of equivalency of the claims as construed for validity are therefore intended to be embraced thereby.

That which is claimed is:

1. A goose decoy comprising:
   a flat silhouette plate not over about 5 millimeters thick, having a perimeter defining the outline of the body, neck and head portions of a goose from a lateral view and having non-glare opposing parallel surfaces with macroscopic depressions and elevations capable of preventing mirror-like glare of reflected sunlight,
   a black sunlight absorbing coating covering said neck portion, said front, top and rear of said head portion and the top and front bottom of said body portion of said opposing surfaces of said silhouette plate and following the contour of said depressions and elevations of said non-glare surfaces,
a white coating covering the middle bottom of said head portion, and the rear bottom of said body portion of said opposing surfaces of said silhouette plate and following the contour of said depressions and elevations of said non-glare surfaces, and
a stake attached to said body portion of said silhouette plate by a pivotable and lockable connection, said stake being for insertion into the ground to support said silhouette plate, said silhouette plate being rotatable in a plane perpendicular to the ground in a clockwise or counterclockwise direction about said connection of said stake and then lockable in any of a multitude of positions for decoy use in hunting and said stake being lockable adjacent said head portion for storage.

2. The decoy of claim 1 wherein said stake is metal for piercing frozen ground.

3. The decoy of claim 1 wherein said stake is black and attached at a black sunlight absorbing region of said body portion.

4. The decoy of claim 1 wherein said depressions comprise rows of depressions and columns of depressions orthogonal to said row of depressions.

5. The decoy of claim 1 wherein said non-glare surface is formed with an irregular roughened surface.

6. The decoy of claim 1 wherein said depressions comprise a screen pattern.

7. The decoy of claim 6 wherein said opposing surfaces include wood fibers extending outwardly from said opposing surfaces.

8. The decoy of claim 1 wherein said connection comprises a threaded bolt extending through said body portion and said stake; and a wing nut tightened to said threaded bolt to lock said silhouette plate and said stake in position.

9. The decoy of claim 8 wherein said connection prevents glare and comprises a threaded bolt having a washer spaced inwardly from its head and a lock washer spaced inwardly from said wing nut to prevent the wing nut from twisting off the bolt.

10. The decoy of claim 1 wherein said lateral view comprises a goose in the sentry position.

11. The decoy of claim 1 wherein said lateral view comprises a goose in the feeding position.

12. The decoy of claim 1 wherein said lateral view comprises a goose in a reaching position having the neck and head portions stretched forwardly and outwardly from said body position.

* * * * *